(12) United States Patent
Sparkes et al.

(10) Patent No.: US 7,138,622 B2
(45) Date of Patent: Nov. 21, 2006

(54) METHOD AND APPARATUS FOR MONITORING LIGHT BEAMS

(75) Inventors: Martin Roy Sparkes, Liverpool (GB); William O'Neill, Histon (GB)

(73) Assignee: Advanced Laser Solutions Limited, Liverpool (GB)

( * ) Notice: Subject to any disclaimer, the term of this patent is extended or adjusted under 35 U.S.C. 154(b) by 0 days.

(21) Appl. No.: 10/502,675

(22) PCT Filed: Jan. 28, 2003

(86) PCT No.: PCT/GB03/00330

§ 371 (c)(1), (2), (4) Date: Apr. 29, 2005

(87) PCT Pub. No.: WO03/064983

PCT Pub. Date: Aug. 7, 2003

(65) Prior Publication Data

US 2005/0219513 A1 Oct. 6, 2005

(30) Foreign Application Priority Data

Jan. 29, 2002 (GB) .................................. 0201916.4

(51) Int. Cl.
- *G01D 5/30* (2006.01)
- *H01J 3/14* (2006.01)
- *H01J 5/16* (2006.01)
- *G02B 26/08* (2006.01)
- *H01S 3/10* (2006.01)

(52) U.S. Cl. ...................... 250/230; 250/235; 250/236; 372/9; 359/199; 359/212

(58) Field of Classification Search ................ 250/559.1–559.49, 234–236, 205, 206.1, 250/230; 359/212, 213, 225, 226, 199; 372/9
See application file for complete search history.

(56) References Cited

U.S. PATENT DOCUMENTS

| 4,521,684 A | * | 6/1985 | Gilby et al. | ............ 250/227.21 |
| 4,693,600 A | * | 9/1987 | Cross et al. | ................. 356/121 |
| 4,848,902 A | * | 7/1989 | Schickle et al. | ............. 356/121 |
| 5,267,012 A | * | 11/1993 | Sasnett et al. | .............. 356/121 |
| 5,333,208 A | * | 7/1994 | Massen | ....................... 382/111 |

(Continued)

FOREIGN PATENT DOCUMENTS

DE          8227494 U     2/1983

(Continued)

OTHER PUBLICATIONS

Lim, G. C., et al., "Instrument for Instantaneous in Situ Analysis of the Mode Structure of a High-Power Laser Beam", *Journal of Physics E. Scientific Instruments*, IOP Publishing, Bristol, GB, vol. 17, No. 11, Nov. 1, 1984, pp. 999-1007.

(Continued)

*Primary Examiner*—Georgia Epps
*Assistant Examiner*—Brian Livedalen
(74) *Attorney, Agent, or Firm*—Wood, Phillips, Katz, Clark & Mortimer (57) ABSTRACT

An apparatus and method for monitoring light beams comprising a reflector for passing at least partially through the beam to reflect a sample of the beam and at least one sensor arranged to receive the reflected beam sample for determining a characteristic of the beam sample. The reflector may be arranged to oscillate and the sensors may he arranged at substantially forty-five or ninety degrees to the axis of the incident beam.

83 Claims, 5 Drawing Sheets

U.S. PATENT DOCUMENTS

| | | | |
|---|---|---|---|
| 6,011,250 A * | 1/2000 | Minakuchi et al. | 250/205 |
| 6,268,876 B1 * | 7/2001 | Ozaki et al. | 347/225 |
| 6,314,221 B1 * | 11/2001 | Riant et al. | 385/37 |
| 6,399,941 B1 * | 6/2002 | Nakagaki et al. | 250/231.13 |
| 6,526,194 B1 * | 2/2003 | Laor | 385/18 |
| 6,673,533 B1 * | 1/2004 | Wohlstadter et al. | 435/6 |
| 2002/0076147 A1 * | 6/2002 | Cush et al. | 385/27 |

FOREIGN PATENT DOCUMENTS

| | | |
|---|---|---|
| FR | 2735575 A | 12/1996 |
| JP | 62 266431 A | 11/1966 |
| JP | 63 033637 A | 2/1988 |
| JP | 63 269588 A | 7/1988 |
| JP | 01 130083 A | 5/1989 |

OTHER PUBLICATIONS

Hirak, D. M., et al., "Measuring the Spatial Intensity Distributioon of High-Power Focused Laser Beams Using a Rotating-Wire Type Laser Beam Analyser I: Theory", *Measurement Science and Technology*, IOP Publishing, Bristol, GB, vol. 5, No. 12, Dec. 1, 1994, pp. 1513-1522.

Patent Abstracts of Japan, vol. 012, No. 240 (P-727) Jul. 8, 1988, re JP 63 033637 A.

Patent Abstracts of Japan, vol. 013, No. 392 (M-865) Aug. 30, 1989, re JP 01 138083 A.

Patent Abstracts of Japan, vol. 013, No. 092 (E-722) Mar. 3, 1989, re JP 63 269588 A.

Patent Abstracts of Japan, vol. 012, No. 147 (P-698) May 7, 1988, re JP 62 266431 A.

* cited by examiner

METHOD AND APPARATUS FOR MONITORING LIGHT BEAMS

The present invention relates to a method and apparatus for monitoring light beams and in particular, for monitoring laser beams.

The laser has become a commonplace tool at the domestic level and in many areas of science, industry and manufacturing. Lasers can be extremely versatile and find applications in a wide range of fields from alignment to welding as well as a multiplicity of other applications. Although the use of the laser has become more and more commonplace in recent years, a significant reason for it not being more universally applied is that the beam itself has constantly changing characteristics. This makes reliability and repeatability of a given process difficult to achieve.

If the characteristics of the beam are known at any given point in time, the laser parameters or alignment may be adjusted on-the-fly to compensate for fluctuations, thereby maintaining a steady-state condition.

The state-of-the-art with respect to beam diagnostics is to position a thick slab of plastic or some other absorber in the path of the beam and to observe the depth to which the plastic becomes burned or melted. The depth to which the plastic is melted or burned is an indicator of the energy intensity at that point, and the position and dimensions of the 'burn profile' may yield additional information such as the beam diameter, beam mode, beam ellipticity and the location of the optical axis. This method provides a qualitative assessment of the beam characteristics. However, it does not easily allow for beam comparisons, and the test cannot be performed whilst the laser is in service, since the plastic effectively blocks the beam for a period of time. Additionally, the available resolution and accuracy are impaired due to vapour interactions with the incident laser beam. Such indeterminable factors can make extracting useful beam information from the background information, extremely difficult.

Another common method for sampling the beam is by way of positioning one or more sensors in the beam path that can detect the beam intensity. The sensor may be moved about different points on the beam profile or there may be an array of sensors, which enable the intensity at different points to be determined simultaneously. In situations where a high power beam is being used, the sensors may be used in conjunction with a beam splitter. The beam splitter can be a prism or partially reflecting mirror that deflects only a portion of the incident beam to the sensor. In this way, the beam can be analysed whilst saving the sensors from destruction. In this case, the working beam has been affected by the measurement process, either by the sensors blocking the beam altogether or by a measurable percentage of the useful working power being directed towards the sensor.

A third known method of measuring the beam properties is by passing a needle, at speed, through the beam and having sensors arranged to detect the reflected light therefrom. By this method, the beam is only slightly disrupted owing to the narrowness of the reflector and the beam is only disrupted for a short period because the flight time of the reflector through the beam is short. Normally, the end portion of the needle is rotated through the beam with the point of rotation of the needle being located a distance away from the beam edge. Typically, the needle is rotated by a motor and is brought to a steady speed before being passed through the beam. The motor, needle and sensor assemblies are generally mounted on a mechanism that enables the spinning needle to be traversed through the beam. The sensors collect data, which is stored on a memory chip or disk. The data is decompiled either later, or on-the-fly, to form an image and or numerical representation of the beam.

The sensors may be thermopiles, photodiodes or pyrosensors depending on the beam type, specific application, economics or any other relevant restrictions. The sensors are normally mounted at positions around the edge of the beam as demanded by the application or space constraints. Additionally, the reflector may, depending on the circumstances, be a mirror, a cylindrical wire, a hollow needle or a knife-edge Alternative embodiments of the third method, as outlined above, incorporate typically, in place of a needle reflector, small mirrors or wave-guides that are passed through the beam. The beam is then directed by the mirror, or is channelled down the wave-guide, to a sensor located near to the hub of the motor. The data is collected and subsequently processed in similar fashion to that described above.

However, data collection by this the method tends to be 'memory intensive' and invariably, much superfluous information is collected. Additionally, the technique relies on the correct calibration of the needle velocity and the accurate alignment of the mechanics of the apparatus in order to give a true representation of the beam profile. Moreover, because readings are taken in a dynamic fashion, the data collected may be skewed in relation to the direction of needle travel. Furthermore, because the needle needs to be accelerated over a period of time and because it cannot be used until it has reached a steady state, the technique cannot be used instantaneously or on demand.

In addition, the location of the beam path, which is of crucial importance in terms of system alignment and safety, can be often difficult to ascertain. Where a visible beam is being used its path may be located by blowing smoke or a visible gas in the vicinity of the beam, which becomes illuminated along the beam locus. Where an invisible beam is used, however, indicators such as light-sensitive materials or tissue papers are placed where the beam is estimated to lie. The location of the optical axis is revealed by a spot or burn mark that forms on the indicator, However, this only tells the operator where the beam intersects the indicator and not the more useful angle of approach. Hence, alignment of a complex multiple-axis optical system, such as a flying optic gantry, can be a difficult and time-consuming task.

An object of the present invention is to provide an improved apparatus and an improved method for monitoring light beams, such as laser beams.

According to a first aspect of the present invention there is provided a method for monitoring light beams comprising passing a reflector at least partially through the beam to reflect a sample of the beam toward a sensor for determining a characteristic of the beam sample, wherein the reflector passes at least partially through the beam in two opposing directions.

According to a second aspect of the present invention there is provided an apparatus for monitoring light beams comprising a reflector for passing at least partially through the beam to reflect a sample of the beam and at least one sensor arranged to receive the reflected beam sample for determining a characteristic of the beam sample, wherein the reflector is an oscillating reflector.

According to a third aspect of the present invention there is provided a method for monitoring light beams comprising the steps of passing a reflector at least partially through the beam to reflect a sample of the beam towards a sensor arranged at substantially forty-five degrees to the incident beam and a sensor arranged substantially orthogonal to the incident beam to receive the reflected beam sample for determining a characteristic of the beam sample.

According to a fourth aspect of the present invention there is provided an apparatus for monitoring light beams comprising a reflector for passing at least partially through the beam to reflect a sample of the beam towards a sensor arranged at substantially forty-five degrees to the incident beam and a sensor arranged substantially orthogonal to the incident beam to receive the reflected beam sample for determining a characteristic of the beam sample.

Preferably, the reflector is substantially narrower than the beam and is constructed of a substantially rigid material, such as, a metal. Preferably still, the reflector is fabricated from, a wire or a needle.

Additionally or alternatively, the reflector may be constructed of a reflective material, but may also be made from a non-reflective material having a reflective coating thereon. Preferably, the reflector or reflective coating will not be significantly damaged by the beam, and will preferably be reflective with respect to the wavelength of the monitored light beam.

The reflector is preferably mounted on an actuator that enables it to be passed through the beam and most preferably, the reflector is motor driven.

There may be one or more reflectors having either dependent or independent oscillating means. Where more than one reflector is provided, each reflector may reflect a beam sample towards one or more sensors for determining the characteristics of different parts the beam. Preferably though, a single reflector is provided for simplicity.

Preferably also, the apparatus comprises means for determining and or controlling the position of the reflector relative to either the apparatus and or the light beam being monitored. The position of the reflector may be determined by any suitable means such as the appropriate use of positional encoders or other electronic or optical devices. Additionally or alternatively, the position may be determined as a function of time whereby the reflector moves from a first position to a second position, at a known velocity, over a pre-determined interval.

Preferably still, information regarding to the position of the reflector is fed back to the actuator that controls the position of the reflector such that the reflector's position relative to the beam and or apparatus are continually controlled.

The sensing means may be provided by way of a sensor or sensors that are sensitive to certain light properties. Suitable means for the present invention includes thermopiles, pyrosensors and photodiodes.

The sensors are preferably used in pairs to enable perpendicular measurements of beam properties to be made however, sensor triplets or quartets may also be used. Additionally or alternatively, multiple sets of sensors may be employed to measure a range of beam properties simultaneously.

Furthermore, additional sensors may be provided that are receptive to different beam types. An application of such an arrangement may be to facilitate the alignment of the main working beam with a low-power alignment or reference beam.

Preferably still, the sensor or sensors are located at positions relative to the apparatus and or incident beam that are optimised for performing a specific function or functions. In a preferred embodiment of the present invention, the main sensors are arranged at an angle of substantially forty-five degrees to the incident beam and additional sensors are arranged orthogonally to the incident beam.

Additionally, attenuators may be placed over the sensors to vary the power range of the device. Such attenuators may be manufactured of germanium, gallium arsenide or a polymeric material.

Additionally or alternatively, the reflector may be translated through the beam to facilitate the collection of additional data. The reflector and actuator may be mounted on a translation stage that is capable of translating the reflector in a plane substantially perpendicular to the incident beam. Preferably still, the translation stage is oriented to move the reflector within said plane along a path, which substantially bisects the angle subtended between any pair of the aforementioned sensors.

In addition, there is preferably a circuit that detects and or controls the position of the reflector or reflectors. Furthermore, there may be a circuit that collects data from the sensor or sensors and stores and or processes this information or that passes the data to an external device, such as, but not exclusively, a computer or display unit. These two circuits may be in communication with one another or may operate as separate entities. There may also be provided a control module that initiates and or controls the measurement process, which may be either manually or automatically operated.

Preferably also, the control circuitry is arranged in such a way as to allow for the monitoring of beams having a wide range of powers without the need either to substitute the sensors or needle, or to manually adjust the amplifier parameters.

Additionally, a preferred embodiment of the present invention includes a device that displays beam property information in one or more of a numerical, pictorial or audible format. In a most preferred embodiment however, there is provided an integrated control device that enables the operator to interrogate the device, co-ordinate the movement of the reflector through the beam, collect data from the sensors, process the data and apply any necessary corrections and display the information in a useful format.

Additionally or alternatively, the control device is arranged to operate automatically, such as at predetermined intervals.

One preferred embodiment of the invention shall now be described, by way of example only, with reference to the following figures:

FIG. 3b shows the relationship between a beam profile and the sensor response when the reflector moves the opposite direction through the beam to that shown in FIG. 3a.

FIG. 5a shows one preferred embodiment of the apparatus being concealed in a case and having an aperture in the case for the beam to pass through.

Figure 1:
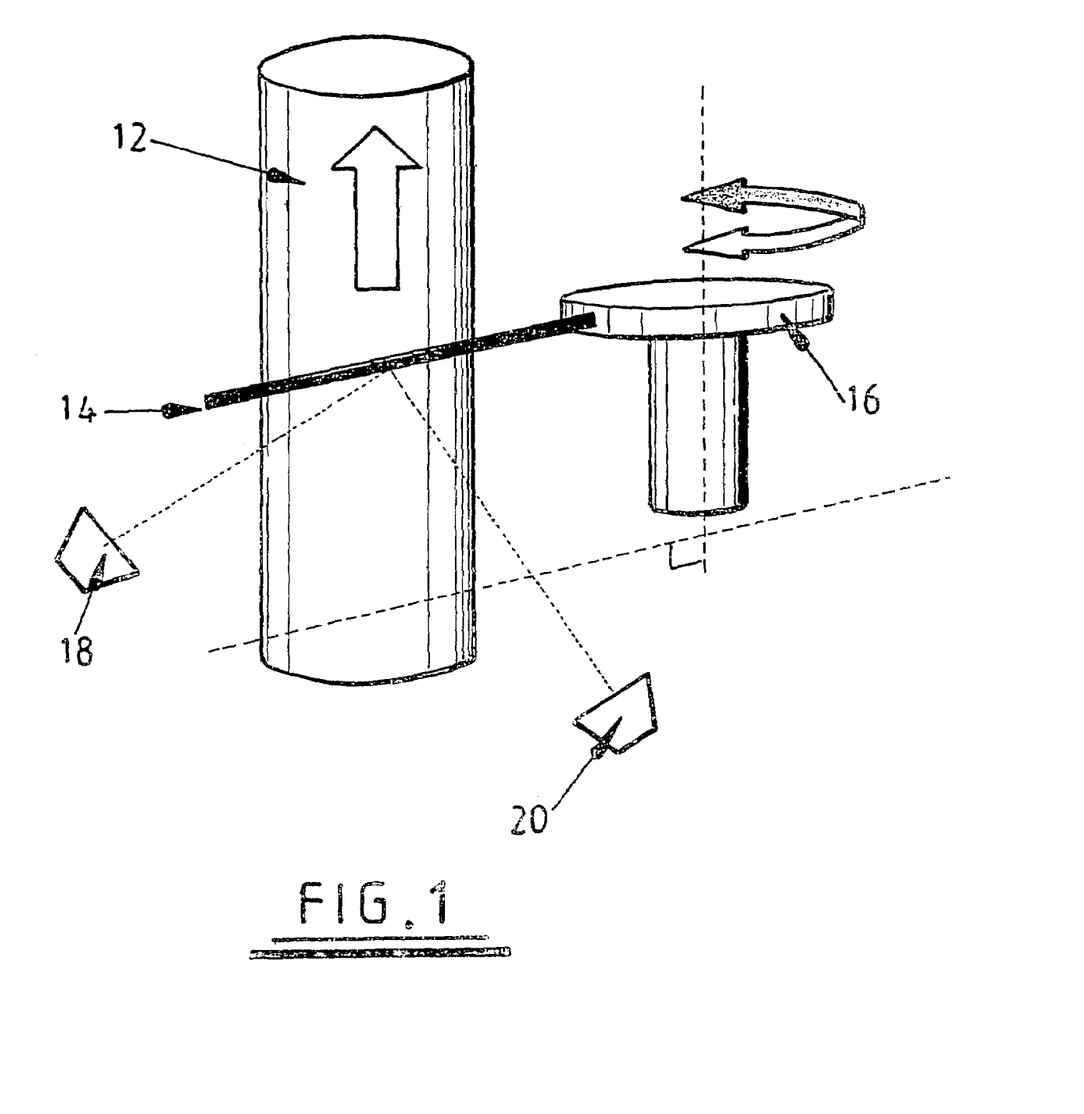
FIG. 1 shows schematically the locations of the reflector, actuator and sensors relative to the beam.

Referring to FIG. 1 of the drawings, there is a beam sensing apparatus generally referred to as 10, being arranged to receive a beam 12 and having a needle 14 mounted on an oscillating motor 16 and at least two sensors 18 and 20 in the vicinity of the beam 12 and needle 14. The beam 12 travels in a generally vertical direction, and is reflected off the needle 14, downwards and outwards towards the sensors 18 and 20.

Figure 2:
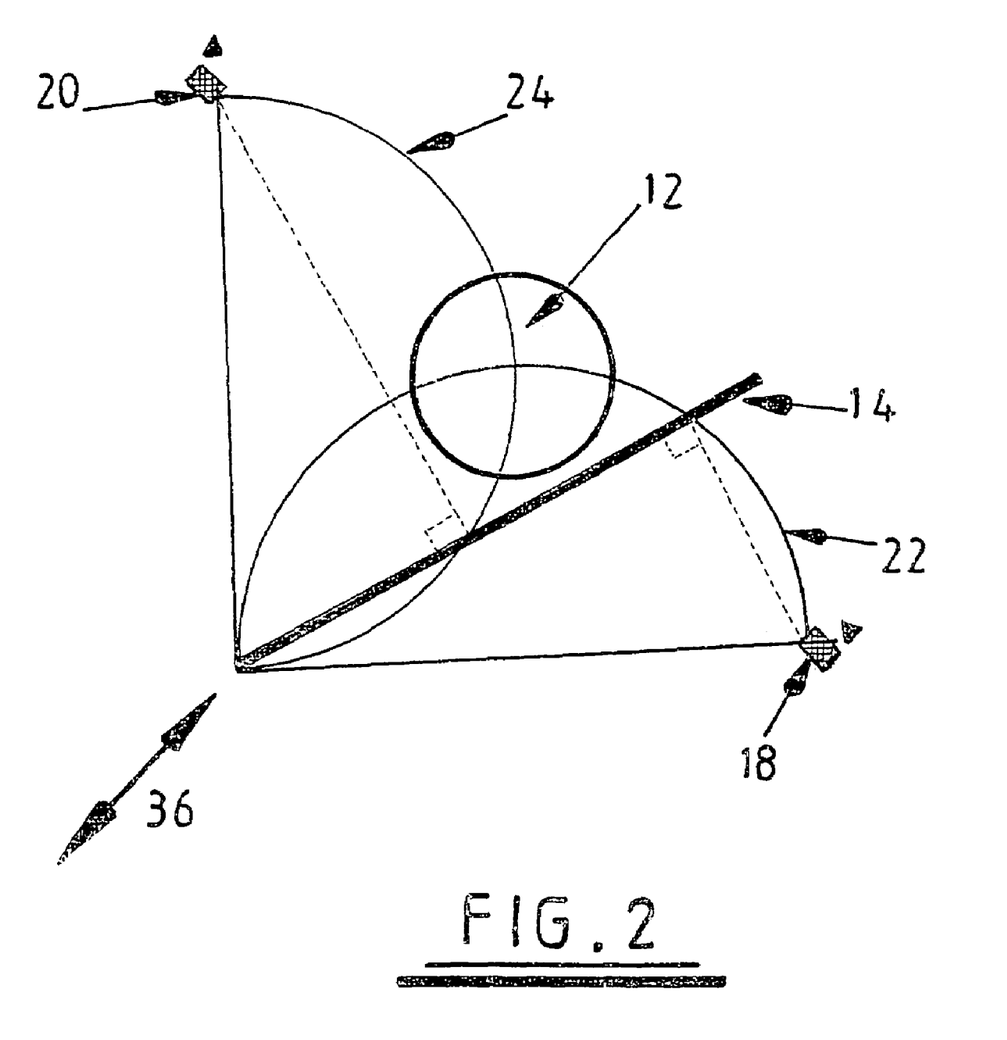
FIG. 2 shows a geometric construction of the sensing loci in plan view.

FIG. 2 shows a geometric construction of the apparatus looking along the beam axis wherein the needle 14 is being passed through the beam 12. A portion of the beam 12 is reflected off the needle 14 and is measured by the sensors 18 and 20, which are sensitive to light that is reflected normally from the needle 14. Hence, the sensors 18 and 20 measure the reflected light along the loci denoted 22 and 24 respectively. In this way, a beam profile may be determined along a pair of substantially orthogonal axes. The beam diameter and centre may also be determined as some function of the points where the measurement loci 22 and 24 intersect the beam 12 edge.

Figure 3A:
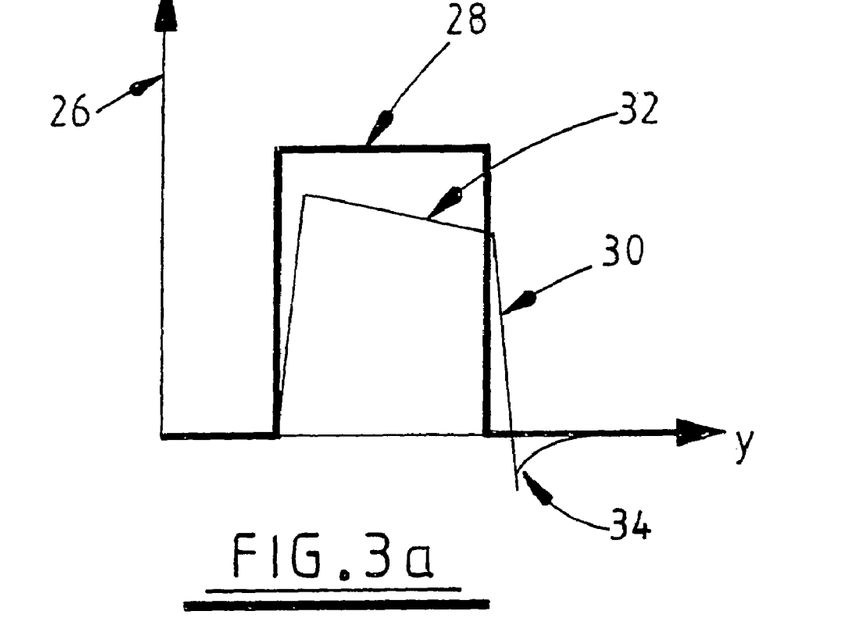
FIG. 3a shows the relationship between a beam profile and the sensor response when the reflector moves in one direction through the beam.
Figure 3B:
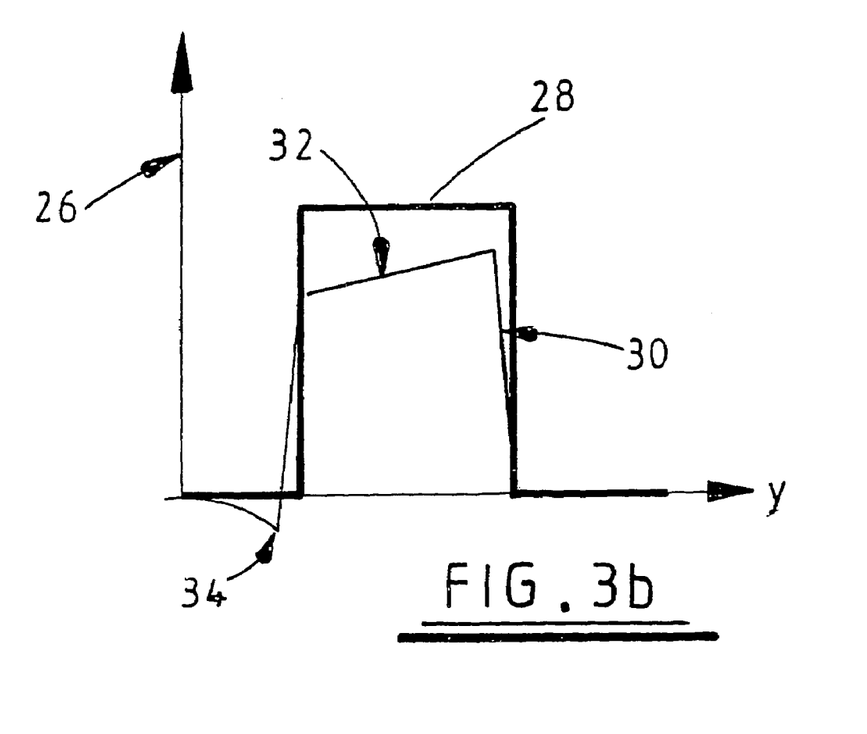

The measurement is repeated with the needle moving in the opposite direction because, and referring now to FIGS. 3a and 3b, the data collected is dependent on the direction in which the needle travels. FIGS. 3a and 3b show typical measured beam profiles 30 in relation to a 'top-hat' beam profile 28 measured with the needle 14 moving in opposite directions. A beam property, such as intensity, is measured on the vertical axis 26 as against needle position y. The measured data 30 is skewed 32 with respect to the actual beam profile 28 and exhibits overshoot 34 or other sensor dependent aberrations. Thus, by combining the data sets obtained by passing the needle 14 through the beam 12 in opposite directions, a more accurate representation of the actual beam profile 28 is obtained.

The needle 14 may be translated through the beam and the measurements repeated to build up a series of profiles at different locations with respect to the beam 12. The preferred translation direction is one that bisects the angle subtended between a pair of sensors, denoted in FIG. 2 by the arrow 36.

Figure 4:
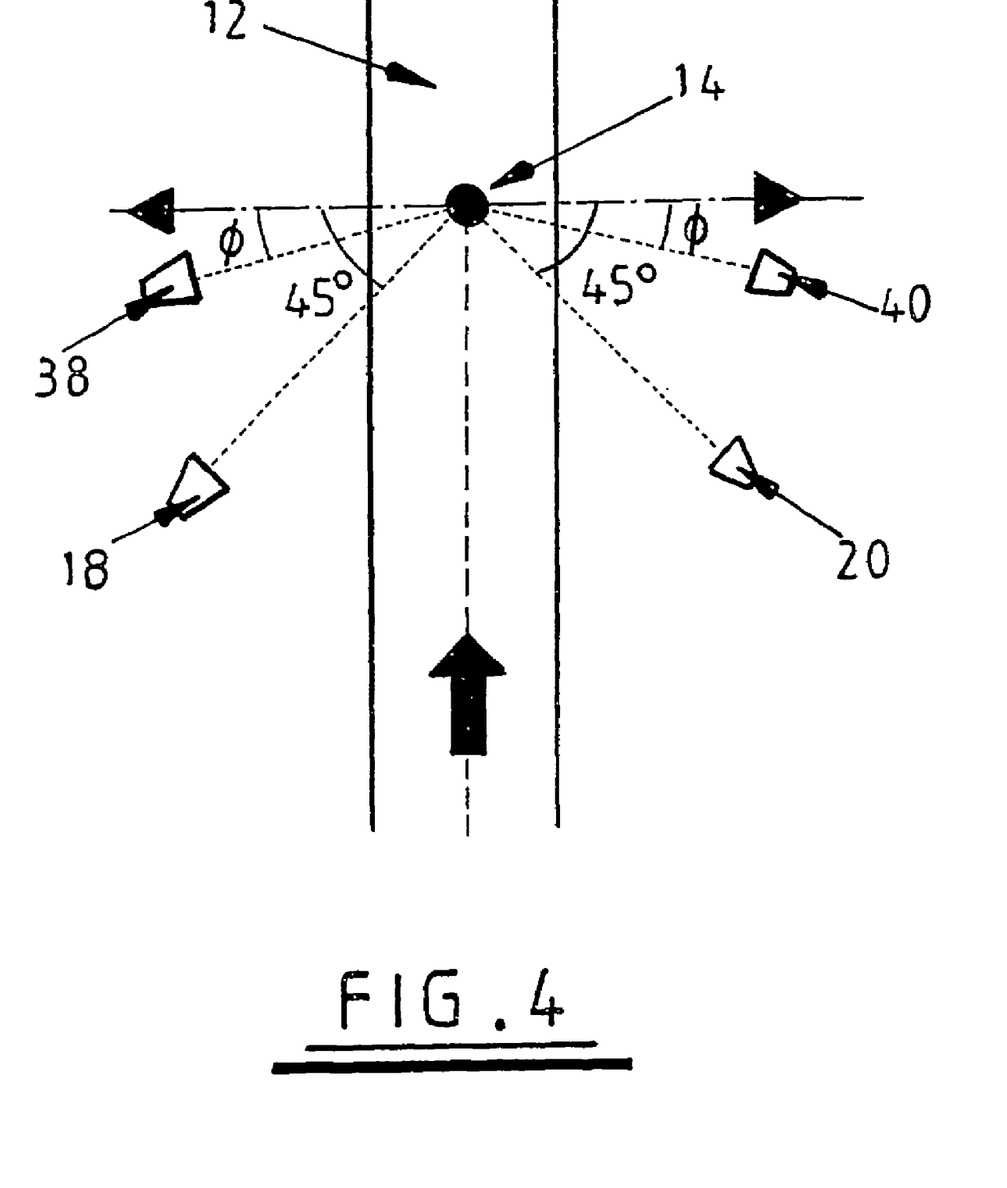
FIG. 4 shows in side elevation, preferred locations of sensors in relation to the incident beam.

There are a number of sensors present for measuring different beam properties such as intensity and frequency, but the primary sensors are mounted at 45 degrees to the beam direction. FIG. 4 shows the primary sensors 18 and 20 located substantially at 45 degrees to the incident beam 12. Additional sensors 38 and 40 are located at other angles denoted by the symbol Φ. The primary sensors mounted at 45 degrees to the beam 12, are the least sensitive to the beam orientation. Hence, misalignment of the apparatus 10 with respect to the beam 12 does not necessarily cause inaccurate data to be collected. The additional sensors 38 and 40 are located at other positions that are more sensitive to the beam 12 orientation. Hence, a slight misalignment will cause large discrepancies between the data collected from these secondary sensors 38 and 40, and the accurate data collected from the primary sensors 18 and 20. Therefore, by performing a comparison and interpolation function between the two sets of data, the beam orientation or so-called pointing vector can be ascertained. Furthermore, with the beam pointing vector known, it is possible to optimise the arrangement of the apparatus such that, the plane in which the needle oscillates is substantially perpendicular to the beam axis.

Figure 5A:
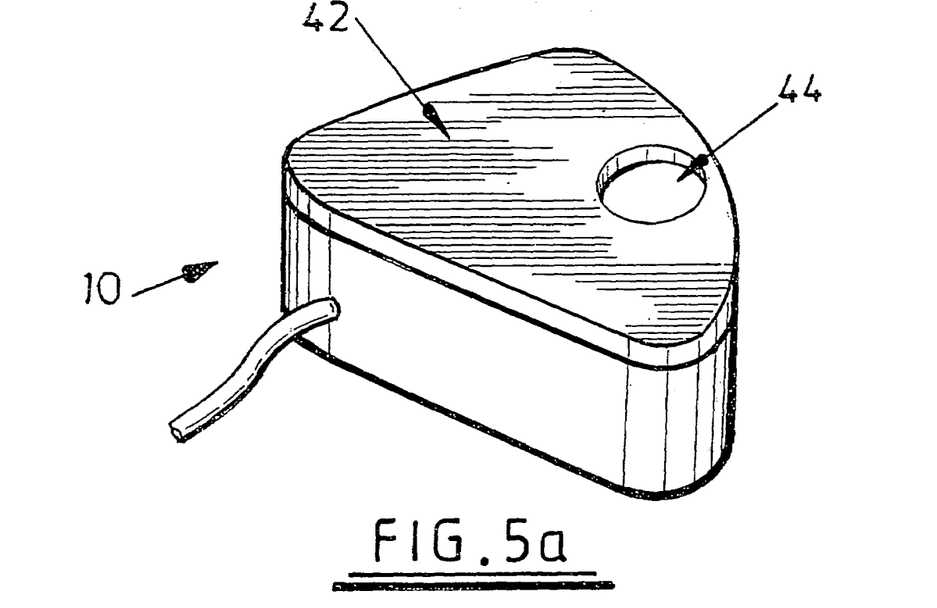

FIG. 5a shows a preferred embodiment of the apparatus 10 contained in a housing 42 having an aperture 44 through which the beam passes.

Figure 5B:
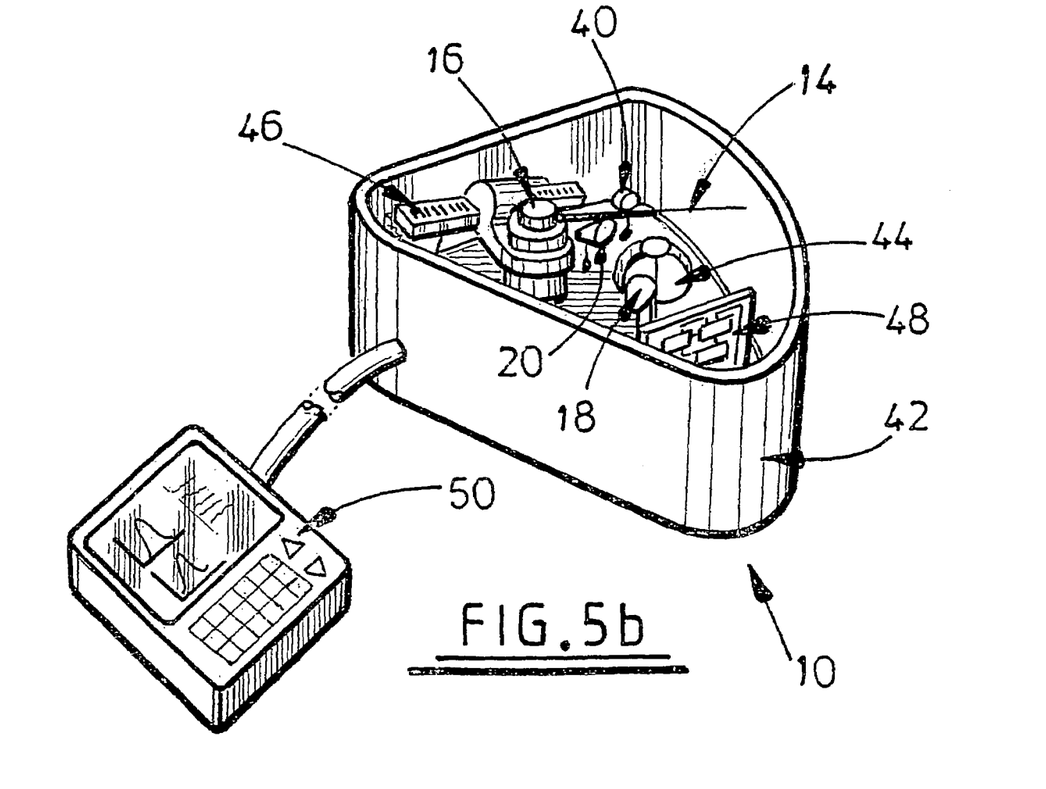
FIG. 5b shows the preferred embodiment of the invention as illustrated in FIG. 5a, having the lid of the case removed to reveal a preferred arrangement of the components of the apparatus, and having a control and display device.

FIG. 5b shows a possible arrangement of components within the housing 42 including the needle 14, the motor 16 mounted on a translation stage 46. Also shown in FIG. 5b, is the on-board circuitry 48 and the external control and display device 50.

The invention claimed is:

1. An apparatus for monitoring light beams comprising a reflector for passing at least partially through a beam to reflect a sample of the beam and at least one sensor arranged to receive the reflected beam sample for determining a characteristic of the beam sample, wherein the reflector is an oscillating reflector, wherein the reflector is a wire or a needle, wherein an actuator is mounted on a translation stage that is capable of translating the reflector in a plane substantially perpendicular to the incident beam, and wherein the translation stage is oriented to move the reflector within a plane substantially perpendicular to the incident beam along a path, which substantially bisects an angle subtended between any pair of sensors.

2. An apparatus as claimed in claim 1, wherein the reflector is constructed of a reflective material.

3. An apparatus as claimed in claim 1, wherein the reflector is constructed of a non-reflective material having a reflective coating thereon.

4. An apparatus as claimed in claim 1, wherein the reflector is mounted on an actuator that enables it to be passed through the beam.

5. An apparatus as claimed in claim 4, wherein the actuator is a motor.

6. An apparatus as claimed in claim 1, further comprising means for determining and or controlling the position of the reflector relative to either the apparatus and or the light beam being monitored.

7. An apparatus as claimed in claim 1, wherein the at least one sensor is a thermopile.

8. An apparatus as claimed in claim 1, wherein the at least one sensor is a pyrosensor.

9. An apparatus as claimed in claim 1, wherein the at least one sensor is a photodiode.

10. An apparatus as claimed in claim 1, having two sensors arranged to enable perpendicular measurements of beam properties to be made.

11. An apparatus as claimed in claim 10, wherein a plurality of pairs of sensors are employed to measure a plurality of beam properties simultaneously.

12. An apparatus as claimed in claim 10, wherein at least one pair of sensors are arranged at an angle of substantially forty-five degrees to the incident beam.

13. An apparatus as claimed in claim 10, wherein at least one pair of sensors are ranged substantially orthogonal to the incident beam.

14. An apparatus as claimed in claim 10, wherein the sensors are provided with attenuators.

15. An apparatus as claimed in claim 14, wherein the attenuators are manufactured of germanium.

16. An apparatus as claimed in claim 14, wherein the attenuators are manufactured of gallium arsnide.

17. An apparatus as claimed in claim 14, wherein the attenuators are manufactured of a polymeric material.

18. An apparatus as claimed in claim 1, further comprising a circuit that detects and controls the position of the reflector.

19. An apparatus as claimed in claim 1, further comprising a circuit that collects data from the sensor or sensors and stores and or processes that data.

20. An apparatus as claimed in claim 1, further comprising a display unit.

21. An apparatus as claimed in claim 1 further comprising a control module that initiates and/or controls a measurement process.

22. An apparatus as claimed in claim 21, wherein the control module is manually operated.

23. An apparatus as claimed in claim 21, wherein the control module is automatically operated.

24. An apparatus as claimed in claim 20, wherein beam property information is displayed in one or more of a numerical, pictorial or audible format.

25. An apparatus as claimed in claim 21, wherein the control module is adapted to operate automatically at pre-determined intervals.

26. An apparatus as claimed in claim 21, wherein the control module is adapted to operate on-demand.

27. A method for monitoring light beams comprising the steps of passing a reflector at least partially through a beam to reflect a sample of the beam towards a sensor for determining a characteristic of the beam sample, wherein the reflector passes at least partially through the beam in two opposing directions, wherein the translation is along a path, substantially bisecting an angle subtended between any pair of sensors.

28. A method as claimed in claim 27, wherein the reflector is passed through the beam using an actuator.

29. A method as claimed in claim 28, wherein the actuator is a motor.

30. A method as claimed in claim 27, wherein the position of the reflector relative to either the apparatus and/or the light beam being monitored is detected and controlled.

31. A method as claimed in claim 27, wherein two sensors are used which enable perpendicular measurements of beam properties to be made.

32. A method as claimed in claim 27, wherein a plurality of beam properties are measured simultaneously using a plurality of pairs of sensors.

33. A method as claimed in claim 31, wherein beam properties are measured using beams reflected at an angle of substantially forty-five degrees to the incident beam.

34. A method as claimed in claim 31, wherein beam properties are measured using beams reflected at an angle of substantially ninety degrees to the incident beam.

35. A method as claimed in claim 27, wherein the reflected beams are attenuated between reflection and detection.

36. A method as claimed in claim 27, wherein the reflector is translatable in a plane substantially perpendicular to the incident beam.

37. A method as claimed in claim 27, further comprising the steps of collecting and storing data from the sensor or sensors.

38. A method as claimed in claim 37, further comprising the step of processing the data collected by the sensor or sensors.

39. A method as claimed in claim 37, further comprising the step of displaying the data collected by the sensor or sensors.

40. A method as claimed in claim 37, wherein the steps of passing the reflector through the beam and collecting data are automatic.

41. A method as claimed in claim 37, wherein the steps of passing the reflector through the beam and collecting data are carried out at pre-determined intervals.

42. A method as claimed in claim 37, wherein the steps of passing the reflector through the beam and collecting data are carried out on-demand.

43. An apparatus for monitoring light beams comprising a reflector for passing at least partially through a beam to reflect a sample of the beam and at least one sensor arranged at substantially forty-five degrees to the incident beam and at least one sensor arranged substantially orthogonal to the incident beam to receive the reflected beam sample for determining a characteristic of the beam sample, wherein the reflector is a wire or a needle.

44. An apparatus as claimed in claim 43, wherein the reflector is constructed of a reflective material.

45. An apparatus as claimed in claim 43, wherein the reflector is constructed of a non-reflective material having a reflective coating thereon.

46. An apparatus as claimed in claim 43, wherein the reflector is mounted on an actuator that enables it to be passed through the beam.

47. An apparatus as claimed in claim 46, wherein the actuator is a motor.

48. An apparatus as claimed in claim 43, further comprising means for determining and or controlling the position of the reflector relative to either the apparatus and or the light beam being monitored.

49. An apparatus as claimed in claim 43, wherein the at least one sensor is a thermopile.

50. An apparatus as claimed in claim 43, wherein the at least one sensor is a pyrosensor.

51. An apparatus as claimed in claim 43, wherein the at least one sensor is a photodiode.

52. An apparatus as claimed in claim 43, having two sensors arranged to enable perpendicular measurements of beam properties to be made.

53. An apparatus as claimed in claim 52, wherein a plurality of pairs of sensors are employed to measure a plurality of beam properties simultaneously.

54. An apparatus as claimed in claim 52, wherein the sensors are provided with attenuators.

55. An apparatus as claimed in claim 54, wherein the attenuators are manufactured of germanium.

56. An apparatus as claimed in claim 54, wherein the attenuators are manufactured of gallium arsnide.

57. An apparatus as claimed in claim 54, wherein the attenuators are manufactured of a polymeric material.

58. An apparatus as claimed in claim 43, further comprising a circuit that detects and controls the position of the reflector.

59. An apparatus as claimed in claim 43, further comprising a circuit that collects data from the sensor or sensors and stores and or processes that data.

60. An apparatus as claimed in claim 43, further comprising a display unit.

61. An apparatus as claimed in claim 43, further comprising a control module that initiates and/or controls a measurement process.

62. An apparatus as claimed in claim 61, wherein the control module is manually operated.

63. An apparatus as claimed in claim 61, herein the control module is automatically operated.

64. An apparatus as claimed in claim 60, wherein beam property information is displayed in one or more of a numerical, pictorial or audible format.

65. An apparatus as claimed in claim 61, wherein the control module is adapted to operate automatically at pre-determined intervals.

66. An apparatus as claimed in claim 61, wherein the control module is adapted to operate on-demand.

67. An apparatus for monitoring light beams comprising a reflector for passing at least partially through a beam to reflect a sample of the beam and at least one sensor arranged at substantially forty-five degrees to the incident beam and at least one sensor arranged substantially orthogonal to the incident beam to receive the reflected beam sample for determining a characteristic of the beam sample, wherein the reflector is mounted on an actuator that enables it to be passed through the beam, and wherein the actuator is mounted on a translation stage that is capable of translating the reflector in a plane substantially perpendicular to the incident beam.

68. An apparatus as claimed in claim 67, wherein the translation stage is oriented to move the reflector within a plane substantially perpendicular to the incident beam along a path, which substantially bisects the angle subtended between any pair of sensors.

69. A method for monitoring light beams comprising the steps of passing a reflector at least partially through a beam to reflect a sample of the beam towards a sensor arranged at substantially forty-five degrees to the incident beam and a sensor arranged substantially orthogonal to the incident beam for determining a characteristic of the beam sample wherein a wire or needle is used as the reflector.

70. A method as claimed in claim 69, wherein the reflector is passed through the beam using an actuator.

71. A method as claimed in claim 70, wherein the actuator is a motor.

72. A method as claimed in claim 69, wherein the position of the reflector relative to either the apparatus and/or the light beam being monitored is detected and controlled.

73. A method as claimed in claim 69, wherein two sensors are used which enable perpendicular measurements of beam properties to be made.

74. A method as claimed in claim 73, wherein a plurality of beam properties are measured simultaneously using a plurality of pairs of sensors.

75. A method as claimed in claim 69, wherein the reflected beams are attenuated between reflection and detection.

76. A method for monitoring light beams comprising the steps of passing a reflector at least partially through a beam to reflect a sample of the beam towards a sensor arranged at substantially forty-five degrees to the incident beam and a sensor arranged substantially orthogonal to the incident beam for determining a characteristic of the beam sample, wherein the reflector is translatable in a plane substantially perpendicular to the incident beam.

77. A method as claimed in claim 76, wherein the translation is along a path, substantially bisecting the angle subtended between any pair of sensors.

78. A method as claimed in claim 69, further comprising the steps of collecting and storing data from the sensor or sensors.

79. A method as claimed in claim 69, further comprising the step of processing the data collected by the sensor or sensors.

80. A method as claimed in claim 69, further comprising the step of displaying the data collected by the sensor or sensors.

81. A method as claimed in claim 78, wherein the steps of passing the reflector through the beam and collecting data are automatic.

82. A method as claimed in claim 78, wherein the steps of passing the reflector through the beam and collecting data are carried out at pre-determined intervals.

83. A method as claimed in claim 78, wherein the steps of passing the reflector through the beam and collecting data are carried out on-demand.

* * * * *